United States Patent
Koyama et al.

(10) Patent No.: US 8,667,912 B2
(45) Date of Patent: Mar. 11, 2014

(54) BURNER FOR HIGHLY CAKING COAL, AND GASIFIER

(75) Inventors: Yoshinori Koyama, Nagasaki (JP); Takeshi Aruga, Nagasaki (JP); Hiromi Ishii, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 932 days.

(21) Appl. No.: 12/664,826

(22) PCT Filed: Jul. 11, 2008

(86) PCT No.: PCT/JP2008/062629
§ 371 (c)(1),
(2), (4) Date: Dec. 15, 2009

(87) PCT Pub. No.: WO2009/069336
PCT Pub. Date: Jun. 4, 2009

(65) Prior Publication Data
US 2010/0180502 A1    Jul. 22, 2010

(30) Foreign Application Priority Data

Nov. 26, 2007 (JP) .................. 2007-304956

(51) Int. Cl.
*F23N 5/18* (2006.01)
*F23N 1/02* (2006.01)
*F23D 1/00* (2006.01)
*F23K 3/02* (2006.01)

(52) U.S. Cl.
USPC ......... 110/186; 110/189; 110/261; 110/104 B

(58) Field of Classification Search
USPC .............. 110/104 B, 186, 189, 260, 261
See application file for complete search history.

(56) References Cited

U.S. PATENT DOCUMENTS 6,835,229 B2 * 12/2004 Brown et al. .................... 75/460
7,762,200 B2 * 7/2010 Fischer et al. ................ 110/347

FOREIGN PATENT DOCUMENTS

| JP | 59020409 A | * | 2/1984 | ................ C21B 7/00 |
| JP | 3-25202 A | | 2/1991 | |
| JP | 3-134093 A | | 6/1991 | |
| JP | 8-3361 B2 | | 1/1996 | |
| JP | 10292182 | * | 11/1998 | ................ C10J 3/46 |
| JP | 2003-279006 A | | 10/2003 | |
| JP | 3790489 B2 | | 6/2006 | |
| KR | 0138690 B1 | | 5/1998 | |

OTHER PUBLICATIONS

Decision of Patent Grant dated Jul. 30, 2012, issued in corresponding Korean Patent Application No. 10-2009-7026906, with Partial translation (3 pages).

(Continued)

*Primary Examiner* — Kenneth Rinehart
*Assistant Examiner* — David J Laux
(74) *Attorney, Agent, or Firm* — Westerman, Hattori, Daniels & Adrian, LLP

(57) ABSTRACT

In a burner for highly caking coal in which a solid fuel channel that is attached penetrating through a surrounding wall of a gasifier for gasifying a highly caking solid fuel that has been pulverized into particles and that supplies the solid fuel into the gasifier by gas flow transportation, and a gasifying agent channel that supplies a gasifying agent into the gasifier are provided, a blockage detection unit that detects a blockage situation of the solid fuel channel is provided, and a process for reducing the temperature of the solid fuel is performed when the blockage detection unit detects a predetermined blockage situation.

10 Claims, 10 Drawing Sheets

(56) References Cited

OTHER PUBLICATIONS

Decision of Patent Grant dated Jul. 3, 2012, issued in corresponding Japanese Patent Application No. 2007-304956, with Partial translation (4 pages).
Official Communication of Intention to Grant a Patent issued on Jul. 2, 2012, for European Patent Application No. 08740679.9 (7 pages).
International Search Report of PCT/JP2008/062629, mailing date of Sep. 9, 2008.
Korean Office Action dated Dec. 28, 2011, issued in corresponding Korean Patent Application No. 2009-7026906.
Notice of Acceptance dated Apr. 12, 2013, issued in corresponding Australian Patent Application No. 2008330933 (4 pages).
Indonesian Notice of Allowance dated Oct. 24, 2013, issued in corresponding Indonesian Patent Application No. W00200903567 (2 pages). Explanation of relevancy: the Notice of Allowance has been received.
Chinese Decision to Grant a Patent dated Aug. 6, 2013, issued in corresponding Chinese Patent Application No. 200880021818.4. (Concise explanation of relevance: the Decision to Grant a Patent has been received).

* cited by examiner

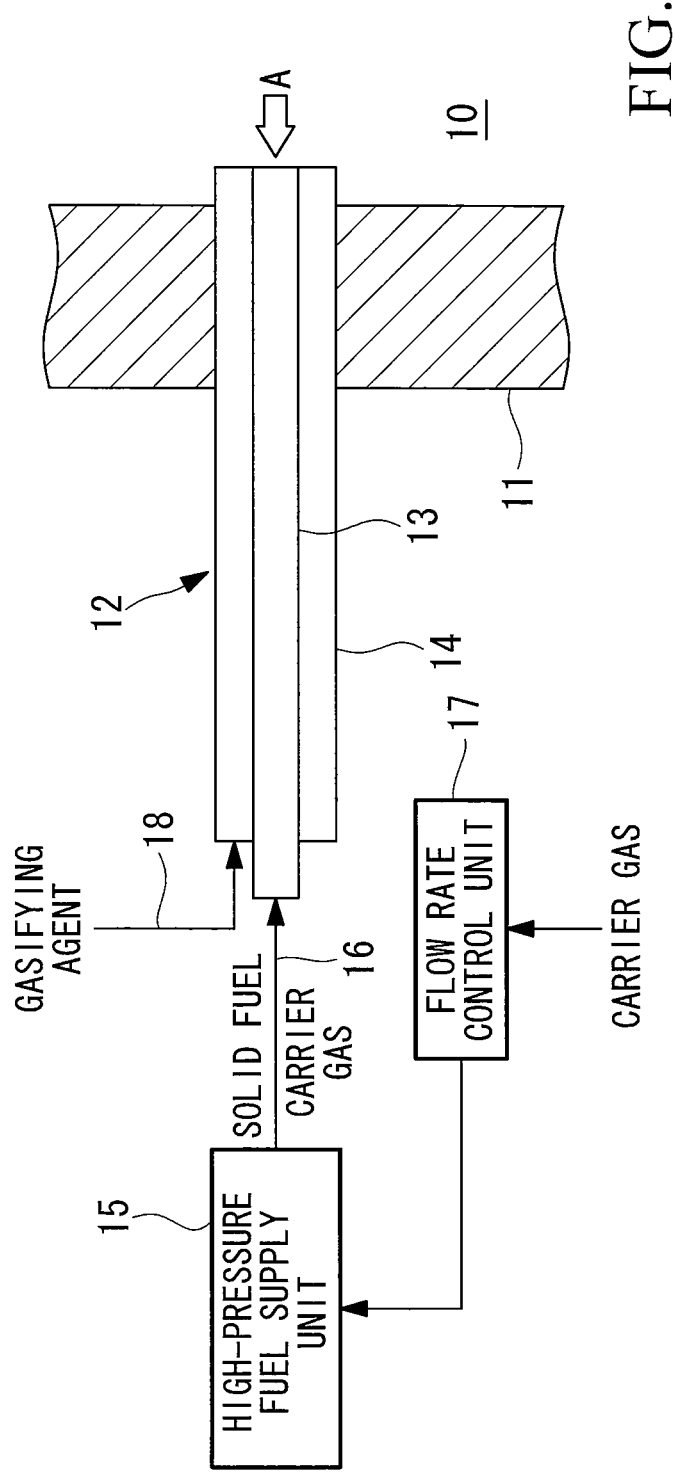
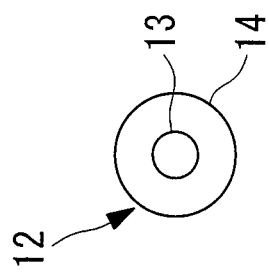
FIG. 10A
FIG. 10B

BURNER FOR HIGHLY CAKING COAL, AND GASIFIER

TECHNICAL FIELD

The present invention relates to a burner for highly caking coal that is applied to a solid fuel gasifier or the like of an integrated coal gasification combined cycle facility, and to a gasifier.

BACKGROUND ART

Conventionally, so-called integrated coal gasification combined cycle power plants (IGCC) have been developed and put into practical use with the goal of improving the power generation efficiency of coal-fired power plants. Such an integrated coal gasification combined cycle power plant (hereinafter, referred to as an "IGCC") includes a gas turbine generator that uses coal gas obtained by gasifying coal as a fuel, to operate and generate power, and a steam turbine generator that uses the steam obtained by recovering heat from high-temperature combustion exhaust gas discharged from the gas turbine using an exhaust heat recovery boiler, to operate and generate power.

In such an IGCC, the fuel supply to the gasifier that generates the coal gas is performed by transporting a solid fuel that has been pulverized into particles to a burner by using gas flow of nitrogen, carbon dioxide, air, or the like as a carrier gas, and jetting the solid fuel from the burner into the gasifier. On the other hand, a high-pressure operation in which the internal pressure in the gasifier is set high is performed, in view of the configuration of the system and the reactions inside the gasifier.

In order to perform such a high-pressure operation, the gasifier that is operated at a high pressure is formed as a pressure vessel, and a burner that penetrates through the wall surface of this pressure vessel houses a solid fuel (pulverized coal, petroleum coke, or the like) and a gasifying agent (air, oxygen, water steam, or the like) in the same pipe.

FIGS. 10A and 10B show a conventional structure in which the burner section of a gasifier is enlarged. In the structure, a burner for highly caking coal (hereinafter referred to as a "burner") 12 is attached penetrating through a surrounding wall (furnace wall) 11 of a gasifier 10 that is formed as a pressure vessel. The burner 12 has a double pipe structure in which a solid fuel channel 13 on the inner side and a gasifying agent channel 14 on the outer side are arranged concentrically.

The solid fuel channel 13 is connected via a fuel supply line 16 with a high-pressure fuel supply unit 15 that supplies a solid fuel that has been pulverized into particles. Also, a carrier gas whose flow rate is controlled by a flow rate control unit 17 is supplied to the high-pressure fuel supply unit 15. Accordingly, the solid fuel channel 13 supplies the solid fuel, which is adjusted to the desired supply rate by the high-pressure fuel supply unit 15, into the gasifier 10, using the carrier gas, which is adjusted to the desired flow rate by the flow rate control unit 17. That is, the particulate solid fuel is transported by the carrier gas flow, and supplied into the gasifier 10.

The gasifying agent channel 14 is connected with a gasifying agent supply line 18 that supplies a gasifying agent, and supplies the gasifying agent, which is adjusted to the desired supply rate by a flow rate control unit (not shown), into the gasifier 10.

Thus, by supplying the solid fuel, the carrier gas, and the gasifying agent into the gasifier 10, the solid fuel that has undergone a predetermined treatment in the gasifier 10 is gasified, and supplied to a gas cleanup facility in a subsequent step.

As another conventional technology, in a pulverized raw material gasification apparatus of the entrained flow-type that uses a pulverized carbon raw material such as coal as a gasification raw material, in addition to using a carrier gas, such as nitrogen gas, for the gasification raw material and an oxidizing agent such as oxygen or air, and gasifies the raw material at a temperature of at least the melting point of the ashes of the pulverized carbon raw material, it is known to provide a gas spouting nozzle upstream of an area near an exit portion where the carrier line of the gasification raw material is supplied into the gasification apparatus, in order to spout a gas such as nitrogen gas, carbon dioxide gas, or an inert gas toward the exit portion of the carrier line, and cause that gas to merge with the gasification raw material. This gas spouting nozzle blows away slag or the like adhering to the exit portion of the carrier line of the gasification raw material, and is considered to be capable of constantly maintaining a state where no matter is adhering to the burner exit portion (for example, see Patent Citation 1).

In addition, a technology has been disclosed by which an auxiliary mixing nozzle that blows, as gas flow, compressed air supplied from a part of a secondary fuel air or from the outside of a wind box is provided in a pulverized solid fuel combustion apparatus that burns a mixture of a solid fuel such as pulverized coal and a gas such as air as a fuel, thereby preventing the erosion of a fuel-air mixture nozzle and the adhesion and deposition of the fuel (for example, see Patent Citation 2).

Patent Citation 1: Japanese Examined Patent Application, Publication No. Hei 08-003361 (see FIG. 1)

Patent Citation 2: The Publication of Japanese Patent No. 3790489

DISCLOSURE OF INVENTION

According to the above-described conventional technology shown in FIGS. 10A and 10B, the high-pressure operation of the gasifier 10 for gasifying the solid fuel leads to a state where the interparticle distance of the solid fuel transported by gas flow is small. That is, the solid fuel transported by gas flow through the solid fuel channel 13 has a very high spatial filling fraction.

On the other hand, in the burner 12 including the solid fuel channel 13 and the gasifying agent channel 14 arranged in a concentric double pipe structure, the heat transfer coefficient between the two channels 13 and 14 becomes high, so that the amount of heat with which the gasifying agent at the high temperature side heats the solid fuel at the low temperature side is increased.

For this reason, the particle temperature of the solid fuel that is subject to heating by the gasifying agent is increased, and the particles of the solid fuel having an elevated temperature fuse and expand. At this time, when the solid fuel is highly caking, there may be the problem that the fused and expanded adjacent particles of the solid fuel agglomerate, thereby causing incomplete combustion, or the problem that the fused and expanded solid fuel adheres to the internal surface of the solid fuel channel 13, thereby causing blockage of the burner 12. Such problems occur not only with burners that use solid fuels such as pulverized coal and petroleum coke, but also with burners of the gasifiers that use other highly caking solid fuels, including, for example, oil residue and plastics.

Thus, in a burner for highly caking coal used for a gasifier for gasifying a highly caking solid fuel, there is a need to solve the problems that could be caused by the temperature increase of the solid fuel particles and the resulting fusion and expansion thereof, due to heat transfer in the burner, which includes a solid fuel channel and a gasifying agent channel in a concentric double pipe structure.

The present invention was achieved in view of the foregoing circumstances, and it is an object of the invention to provide a burner for highly caking coal in which a solid fuel channel and a gasifying agent channel are provided in a double pipe structure, wherein the temperature increase of the particles of a highly caking solid fuel due to heat transfer in the burner and the resulting fusion and expansion of the particles are prevented or suppressed, thereby enabling a stable operation of the gasifier.

The following solutions were used for the present invention in order to solve the above-described problems.

A burner for highly caking coal according to the present invention is a burner for highly caking coal in which a solid fuel channel that is attached penetrating through a furnace wall of a gasifier for gasifying a highly caking solid fuel that has been pulverized into particles and that supplies the solid fuel into the gasifier by gas flow transportation, and a gasifying agent channel that supplies a gasifying agent into the gasifier are provided in a double pipe structure, wherein a blockage situation detection means that detects a blockage situation of the solid fuel channel is provided, and a process for reducing a temperature of the solid fuel is performed when the blockage situation detection means detects a predetermined blockage situation.

With such a burner for highly caking coal, a blockage situation detection means that detects a blockage situation of the solid fuel channel is provided, and a process for reducing the temperature of the solid fuel is performed when the blockage situation detection means detects a predetermined blockage situation. Accordingly, it is possible to decrease the solid fuel temperature that may cause a channel blockage, in accordance with the state of progress of the channel blockage of the solid fuel channel, thereby preventing or suppressing the fusion and the expansion due to a temperature increase of the particles of the highly caking solid fuel.

In the invention described above, it is preferable that the temperature reduction process includes outputting a control signal for increasing an amount of a carrier gas used for the gas flow transportation. This reduces the retention time of the solid fuel and the carrier gas in the solid fuel channel, so that the amount of heat exchanged between the solid fuel and the high-temperature gasifying agent can be reduced.

In the invention described above, it is preferable that the temperature reduction process includes outputting a control signal for decreasing a temperature of the gasifying agent. This reduces the temperature of the gasifying agent on the heating side, thereby decreasing the temperature difference between the solid fuel and the carrier gas that flow through the inside of the solid fuel channel. Accordingly, it is possible to reduce the amount of heat exchanged between a solid fuel and a high-temperature gasifying agent.

In the invention described above, it is preferable that the temperature reduction process includes, in combination, outputting a control signal for increasing an amount of a carrier gas used for the gas flow transportation, and outputting a control signal for decreasing a temperature of the gasifying agent. This reduces the retention time of the solid fuel and the carrier gas in the solid fuel channel, as well as the temperature of the gasifying agent and the temperature difference between the solid fuel and the carrier gas that flow through the solid fuel channel, thereby reducing the amount of heat exchanged between the solid fuel and the high-temperature gasifying agent even more efficiently.

In the invention described above, it is preferable that the blockage situation detection means detects a differential pressure between a burner inlet of the solid fuel channel and a suitable place located downstream from the burner inlet, and judges that a blockage situation is detected when a flow loss coefficient converted from the differential pressure increases to at least a predetermined value. This makes it possible to reliably judge a channel blockage situation of the solid fuel channel, based on a flow loss coefficient obtained by converting the pressure of the gasifier and the differential pressure that changes according to the flow rate of the solid fuel and the flow rate of the carrier gas.

In the invention described above, it is preferable that the blockage situation detection means judges that a blockage situation is detected when a flow loss coefficient converted from a differential pressure ratio of a first differential pressure detected between a burner inlet and a suitable place located downstream from the burner inlet and a second differential pressure measured in an arbitrary section set in a fuel supply line connected to an upstream side of the solid fuel channel increases to at least a predetermined value. This makes it possible to reliably judge a channel blockage situation of the solid fuel channel, based on a flow loss coefficient obtained by the pressure of the gasification channel and the differential pressure that is not affected by the influence of the flow rate of the solid fuel and the flow rate of the carrier gas.

In the invention described above, it is preferable that the temperature reduction process comprises an upper limit monitoring means that detects an internal surface temperature of the solid fuel channel, and monitors the internal surface temperature so that the internal surface temperature does not become greater than a preset temperature determined according to a caking property of the solid fuel. This enables an efficient operation at a maximum temperature at which the problem of channel blockage does not occur.

A gasifier according the present invention is a gasifier in the form of a pressure vessel into which a solid fuel such as particulate highly caking coal is supplied by gas flow transportation, and that subjects the solid fuel to a gasification treatment under a high-pressure environment together with a gasifying agent, wherein the gasifier includes the burner for highly caking coal according to any of claims 1 to 7.

Such a gas furnace includes the above-described burner for highly caking coal, and therefore can decrease the solid fuel temperature that may cause a channel blockage, in accordance with the state of progress of the channel blockage of the solid fuel channel in the burner for highly caking coal, thereby preventing or suppressing the fusion and the expansion due to a temperature increase of the particles of the highly caking solid fuel.

With the present invention described above, in a burner for highly caking coal used for a gasifier for gasifying a highly caking solid fuel, it is possible to prevent or suppress the fusion and expansion of the solid fuel particles that could be caused by the temperature increase of the solid fuel particles, due to heat transfer in the burner, which includes a solid fuel channel and a gasifying agent channel in a concentric double pipe structure. Accordingly, it is possible to prevent the problem that fused and expanded adjacent particles agglomerate due to the temperature increase of the highly caking solid fuel, thereby causing incomplete combustion, or the problem that those particles adhere to the internal surface of the solid fuel channel, thereby causing blockage. Accordingly, it is possible to operate the burner for highly caking coal and the gasifier in a stable manner. Furthermore, it is also possible to expand the range of applications for highly caking solid fuels that can be used for the burner for highly caking coal and the gasifier.

BRIEF DESCRIPTION OF DRAWINGS

FIG. 10A is a configuration diagram illustrating an example of a conventional burner for highly caking coal and gasifier.

FIG. 10B is a view taken along the arrows A-A in FIG. 10A.

EXPLANATION OF REFERENCE

10: Gasifier
11: Surrounding wall (Furnace wall)
12: Burner for highly caking coal (Burner)
13: Solid fuel channel
14: Gasifying agent channel
20, 20A to 20F: Blockage detection unit
30: Temperature control unit
40: Temperature sensor

BEST MODE FOR CARRYING OUT THE INVENTION

Hereinafter, one embodiment of a burner for highly caking coal and a gasifier according to the present invention will be described based on the drawings.

Figure 2:
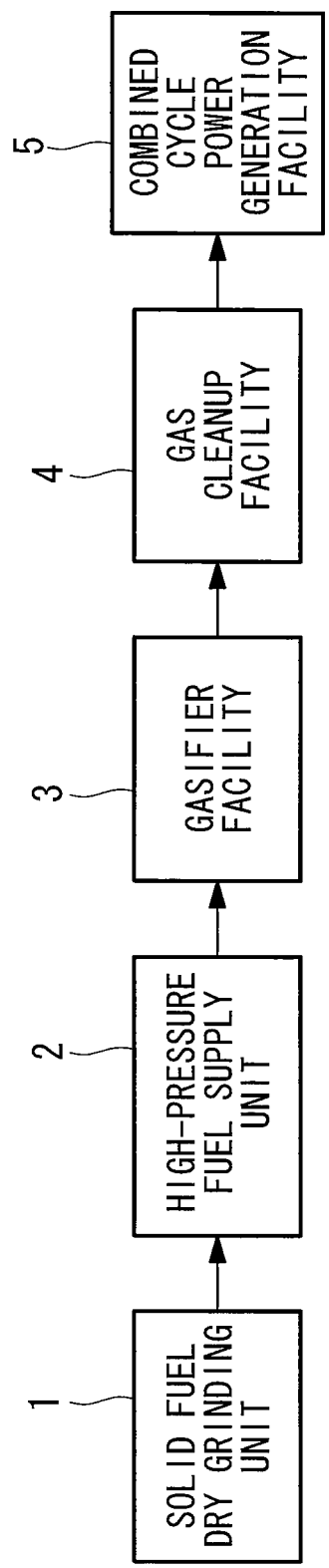
FIG. 2 is a block diagram showing the outline of an integrated coal gasification combined cycle plant (IGCC).

FIG. 2 is a block diagram showing the outline of an integrated coal gasification combined cycle (IGCC). This IGCC is a combined cycle power generation facility that generates power using coal gas obtained by gasifying coal (a solid fuel) as a fuel. That is, the IGCC includes, as its main components, a solid fuel dry grinding unit 1 that dries and grinds a solid fuel such as coal into a particulate solid fuel, a high-pressure fuel supply unit 2 that supplies the particulate solid fuel by gas flow using a carrier gas, a gasifier facility 3 that receives the supply of the solid fuel transported by gas flow into the gasifier and the gasifying agent, and gasifies the solid fuel to obtain a gasified coal gas, a gas cleanup facility 4 that removes impurities and the like contained in the coal gas produced at the gasifier facility 3, thereby purifying the coal gas, and a combined cycle power generation facility 5 constituted by a gas turbine generator and a steam turbine generator.

The gas turbine generator is a generator that operates a gas turbine by using purified coal gas as a fuel, and generates power by being driven by the shaft output of the gas turbine.

The steam turbine generator is a generator that generates power by being driven by the shaft output of the steam turbine operated using steam energy produced by recovering heat from the combustion exhaust gas by introducing a high-temperature combustion exhaust gas into an exhaust heat recovery boiler discharged from the gas turbine of the gas turbine generator.

First Embodiment

Figure 1:
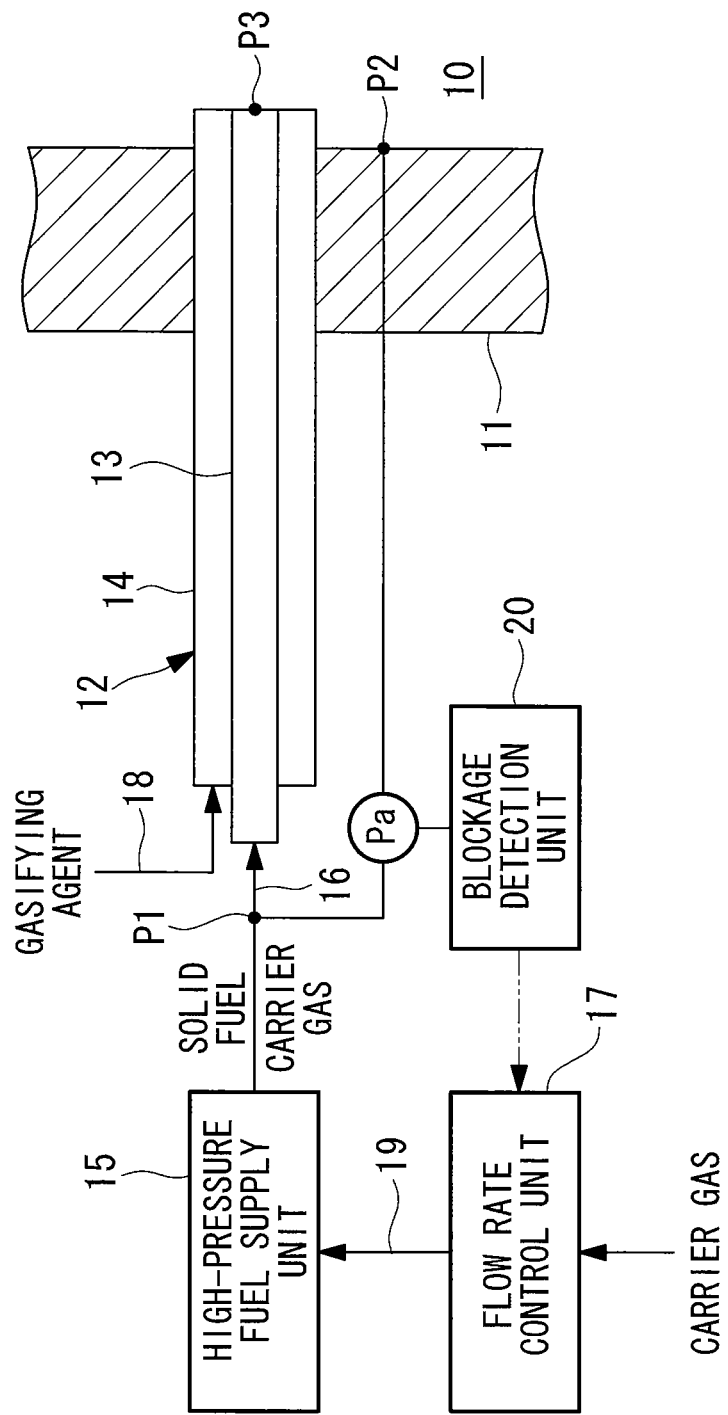
FIG. 1 is a configuration diagram of a relevant part illustrating a first embodiment of a burner for highly caking coal and a gasifier according to the present invention.

As shown in FIG. 1, the gasifier facility 3 of the IGCC described above is provided with a gasifier 10 in the form of a pressure vessel. A burner 12 for highly caking coal (hereinafter referred to as a "burner") is attached to the gasifier 10 such that it penetrates through a surrounding wall 11, which is a furnace wall constituting the pressure vessel.

The burner 12 has a concentric double pipe structure including a solid fuel channel 13 that is disposed on the inner side, and a gasifying agent channel 14 that is disposed on the outside.

The solid fuel channel 13 is a fuel supply channel that supplies a highly caking solid fuel that has been pulverized into particles into the gasifier 10. The solid fuel channel 13 is connected with a high-pressure fuel supply unit 15 via a fuel supply line 16.

The high-pressure fuel supply unit 15 is an apparatus for receiving supply of the solid fuel pulverized into particles, and supplying the desired amount of the solid fuel to the gasifier 10 by gas flow transportation using a carrier gas. The carrier gas is supplied to the high pressure fuel supply unit 15 via the flow rate control unit 17 and a carrier gas supply line 19. Carrier gases that can be used for the gas flow transportation in this case include nitrogen, carbon dioxide, air, and the like.

The gasifying agent channel 14 is connected with a gasifying agent source (not shown) via a gasifying agent supply line 18. The gasifying agent channel 14 supplies a high-temperature gasifying agent that is adjusted at the desired flow rate into the gasifier 10. Gasifying agents that can be used in this case include air, oxygen, steam, and the like.

Thus, in the burner 12, the solid fuel channel 13 that is attached penetrating through the surrounding wall (furnace wall) 11 of the gasifier 10 for gasifying a highly caking solid fuel that has been pulverized into particles and supplying the solid fuel into the gasifier 10 by gas flow transportation, and the gasifying agent channel 14 that supplies a gasifying agent into the gasifier are arranged in a double pipe structure.

Moreover, the burner 12 described above includes a blockage detection unit 20 that is provided as a blockage situation detection means to detect a blockage situation of the solid fuel channel 13. The blockage detection unit 20 detects a differential pressure Pa between the pressure at the burner inlet of the solid fuel channel 13 and the internal pressure of the gasifier 10 as a suitable place located downstream from the burner inlet. When a flow loss coefficient converted from that differential pressure Pa increases to at least a predetermined value, the blockage detection unit 20 judges that a blockage situation of the solid fuel channel 13 has been detected. In the illustrated example, the burner inlet pressure P1 of the solid fuel channel 13 and the internal pressure P2 of the gasifier 10 are detected, and the differential pressure Pa is calculated from the two pressures P1 and P2. It should be noted that for the differential pressure Pa calculated here, a burner outlet pressure P3 may be used in place of the internal pressure P2 of the gasifier 10.

When the blockage detection unit 20 detects a predetermined blockage situation, a process for reducing the temperature of the solid fuel is carried out. This temperature reduction process reduces the retention time of the solid fuel and the carrier gas in the solid fuel channel 13 by outputting a control signal for increasing the amount of the carrier gas used for the gas flow transportation. That is, by increasing the flow velocity of the solid fuel flowing through the inside of the solid fuel channel 13 in the burner 12 having the concentric double pipe structure, the time is shortened during which heat exchange is carried out between the solid fuel on the low temperature side and the gasifying agent on the high temperature side. Accordingly, the amount of heat exchanged between the solid fuel and the gasifying agent is reduced. As a result, it is possible to prevent the solid fuel from being heated by the high-temperature gasifying agent flowing around the solid fuel, thereby making it possible to prevent or suppress the temperature of the solid fuel particles from increasing to a temperature at which those particles fuse and expand.

Figure 3:
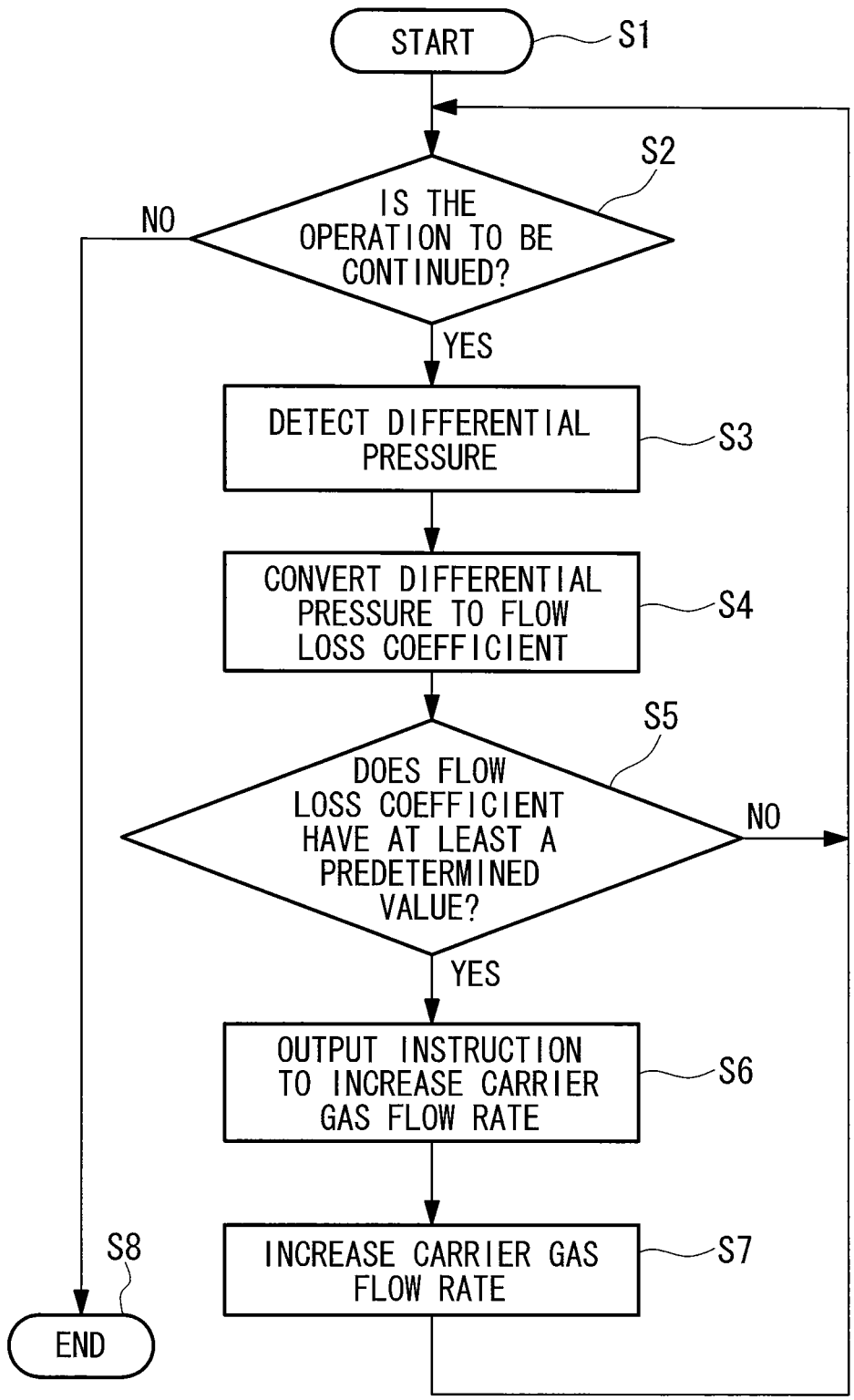
FIG. 3 is a flowchart illustrating an example of control for a blockage detection unit according to the first embodiment.

Hereinafter, an example of a control performed within the blockage detection unit 20 will be described based on the flow chart shown in FIG. 3.

After the control starts at the first step S1, the procedure moves to the subsequent step S2, at which the judgment "Is the operation to be continued?" is carried out. If the result is "YES" and the operation of the gasifier 10 is continued, the procedure moves to the subsequent step S3, at which a differential pressure Pa is detected. The differential pressure Pa in this case is obtained by detecting the burner inlet pressure P1 of the solid fuel channel 13 and the internal pressure P2 of the gasifier 10. It should be noted that if the result in step S2 is "NO" and the operation of the gasifier 10 will not be continued, the procedure moves to the subsequent step S8, at which the control ends.

The differential pressure Pa detected at step S3 is converted into a flow loss coefficient λ in the subsequent step S4. That is, in the case of transporting the solid fuel particles by gas flow, the differential pressure Pa changes depending on the internal pressure of the gasifier 10, the flow rate of the solid fuel, and the flow rate of a carrier gas. Accordingly, in order to reliably judge the channel blockage situation of the solid fuel channel, it is desirable to carry out a judgment based on a flow loss coefficient λ obtained by converting the differential pressure Pa. The flow loss coefficient λ is a value used for a known expression for determining the pressure loss of a solid-gas two-phase flow. That is, since the differential pressure Pa described above is a value equivalent to a pressure loss, it is possible to calculate an actual flow loss coefficient λ in the burner 12 from the known expression for determining this pressure loss and a detected value of the differential pressure Pa.

In the subsequent step S5, the flow loss coefficient λ calculated at step S4 is subjected to the judgment "Does the flow loss coefficient have at least a predetermined value?". If this result is YES and the flow loss coefficient λ has at least a predetermined value, it can be judged that a larger pressure loss of at least a predetermined value has occurred in a solid-gas two-phase flow of the solid fuel and the carrier gas that flow through the solid fuel channel 13. That is, it can be judged that a situation has occurred where the pressure loss of the solid-gas two-phase flow increases, including for example, a situation where the solid fuel adheres to the internal surface of the solid fuel channel 13, thus reducing the channel cross sectional area. Accordingly, the procedure moves to the subsequent step S6, at which an instruction to increase the carrier gas flow rate is output. It should be noted that if the result at step S5 is "NO" and the flow loss coefficient λ has a value smaller than a predetermined value, then it is judged that there is no problem in the current operation, and the procedure moves to step S2 described above, and repeats the same control flow.

If an instruction to increase the carrier gas flow rate is output at step S6, the procedure moves to the subsequent step S7, at which the carrier gas flow rate is increased. That is, when the flow rate control unit 17 receives the instruction to increase the carrier gas flow rate, an operation of increasing the flow rate of the carrier gas supplied to the high-pressure fuel unit 17 is performed.

As a result, the amount of the carrier gas for the gas flow transportation in the solid fuel channel 13 increases, and the flow velocities of the solid fuel and the carrier gas that flow through the inside of the solid fuel channel 13 increase, so that the time during which the solid fuel is retained in the channel is reduced. That is, the time during which the solid fuel on the low temperature side flowing through the inside of the solid fuel channel 13 receives heat from the high-temperature gasifying agent flowing around the solid fuel is shortened, so that it is possible to prevent or suppress a temperature increase of the solid fuel.

After the control for increasing the amount of the carrier gas is performed in this manner, the procedure returns to step S2, and repeats the same control flow.

When a blockage situation of the solid fuel channel 13 is detected by this control performed by the blockage detection unit 20, the flow rate of the carrier gas is increased as the temperature reduction process for the solid fuel, and thus the flow velocity is increased. Accordingly, it is possible to reduce a temperature increase of the solid fuel that could cause a channel blockage, in accordance with the state of progress of the channel blockage of the solid fuel channel 13. Therefore, the particles of the highly caking solid fuel can be prevented or suppressed from increasing to a high temperature greater than a prescribed temperature that varies depending on the type of the solid fuel, so that the adhesion to the wall surface or the agglomeration due to their fusion and expansion can also be prevented or suppressed.

Second Embodiment

Figure 4:
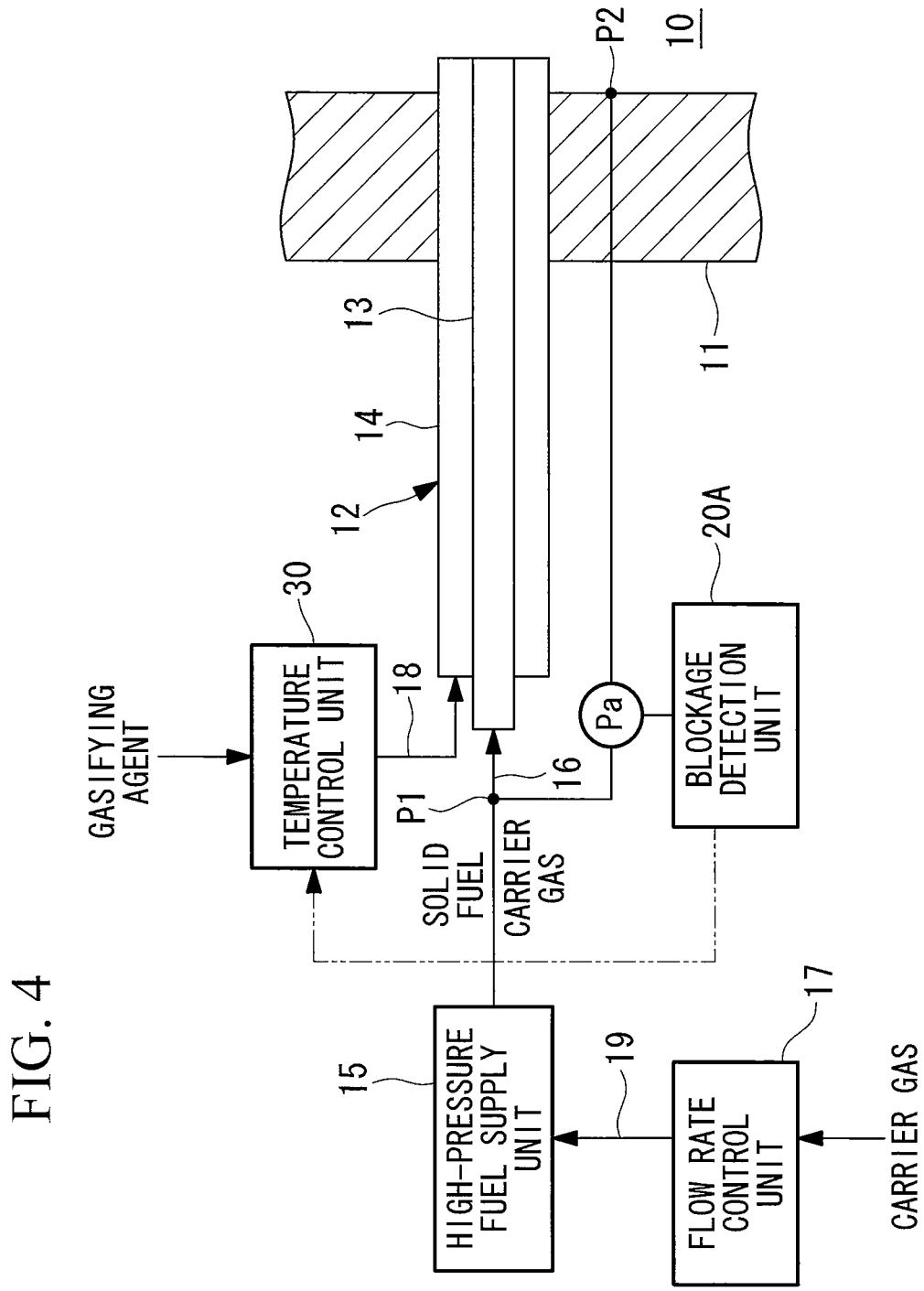
FIG. 4 is a configuration diagram of a relevant part illustrating a second embodiment of a burner for highly caking coal and a gasifier according to the present invention.

A second embodiment of the present invention will be described based on FIG. 4. It should be noted that the same portions in FIG. 4 as in the above-described embodiment are denoted by the same reference numerals, and a detailed description thereof has been omitted.

In this embodiment, when a blockage situation is detected, a different temperature reduction process is performed by a blockage detection unit 20A. That is, instead of increasing the amount of the carrier gas in the above-described embodiment, a temperature reduction process in which a control signal for decreasing the temperature of the gasifying agent is output is performed.

Hereinafter, the temperature reduction control by which the temperature of the gasifying agent is decreased will be described specifically. In order to enable this temperature reduction control, a temperature control unit 30 is provided in the gasifying agent supply line 18.

The temperature control unit 30 has the function of receiving an instruction to decrease the temperature of the gasifying agent that is output from the blockage detection unit 20A, and controlling the final temperature of the gasifying agent that is supplied to the gasifying agent channel 14 of the burner 12, for example, by adjusting the mixing ratio of gasifying agents having different temperatures.

When a blockage situation of the solid fuel channel 13 is detected in the same manner as in the above-described embodiment, by performing such controls using the blockage detection unit 20A and the temperature control unit 30, the temperature of the gasifying agent is decreased as the temperature reduction process for the solid fuel. Accordingly, it is possible to reduce the temperature increase of the solid fuel that could cause a channel blockage, in accordance with the state of progress of the channel blockage of the solid fuel channel 13. Therefore, the particles of the highly caking solid fuel can be prevented or suppressed from increasing to a high temperature greater than a prescribed temperature that varies depending on the type of the solid fuel, so that the adhesion to the wall surface or the agglomeration due to their fusion and expansion can also be prevented or suppressed.

Third Embodiment

A third embodiment of the present invention will be described based on FIG. 5. It should be noted that the same portions in FIG. 5 as in the above-described embodiments are denoted by the same reference numerals, and a detailed description thereof has been omitted.

In this embodiment, a different blockage situation detection means that detects a blockage situation is used. That is, in place of a flow loss coefficient $\lambda$ converted from a differential pressure Pa in the above-described embodiments, a flow loss coefficient $\lambda'$ converted based on a differential pressure ratio is used as a judgment criterion of a channel blockage situation.

More specifically, a blockage detection unit 20B serving as a blockage situation detection means in this embodiment judges that a blockage situation has been detected when a flow loss coefficient $\lambda'$ converted from the differential pressure ratio of a first differential pressure Pa detected between the pressure P1 at the burner inlet and the internal pressure P2 of the gasifier 10 located downstream from the burner inlet, and a second differential pressure Pb measured in an arbitrary section set in the fuel supply line 16 connected to the upstream side of the solid fuel channel 13 has increased to at least a predetermined value. In the illustrated example, two pressures P4 and P5 are detected in two fixed measurement positions set in suitable places of the fuel supply line 16, and a differential pressure Pb generated between the two pressures P4 and P5 is the second differential pressure. That is, the second differential pressure Pb approximately matches the pressure loss that has occurred in a solid-gas two-phase flow that has flown a predetermined channel length set in the fuel supply line 16.

Accordingly, the differential pressure ratio of the first differential pressure Pa and the second differential pressure Pb is a value that will not be affected by the influence of the pressure of the gasifier 10, the flow rate of the solid fuel and the flow rate of the carrier gas, so that it is possible to reliably judge the channel blockage situation of the solid fuel channel 13, based on the flow loss coefficient $\lambda'$ obtained by this differential pressure ratio. That is, by using, as the judgment criterion, whether or not the flow loss coefficient $\lambda'$ has at least a predetermined value, and judging the occurrence of a predetermined blockage situation when the flow loss coefficient $\lambda'$ has at least a predetermined value, the channel blockage situation of the solid fuel channel 13 can be judged even more reliably.

Figure 5:
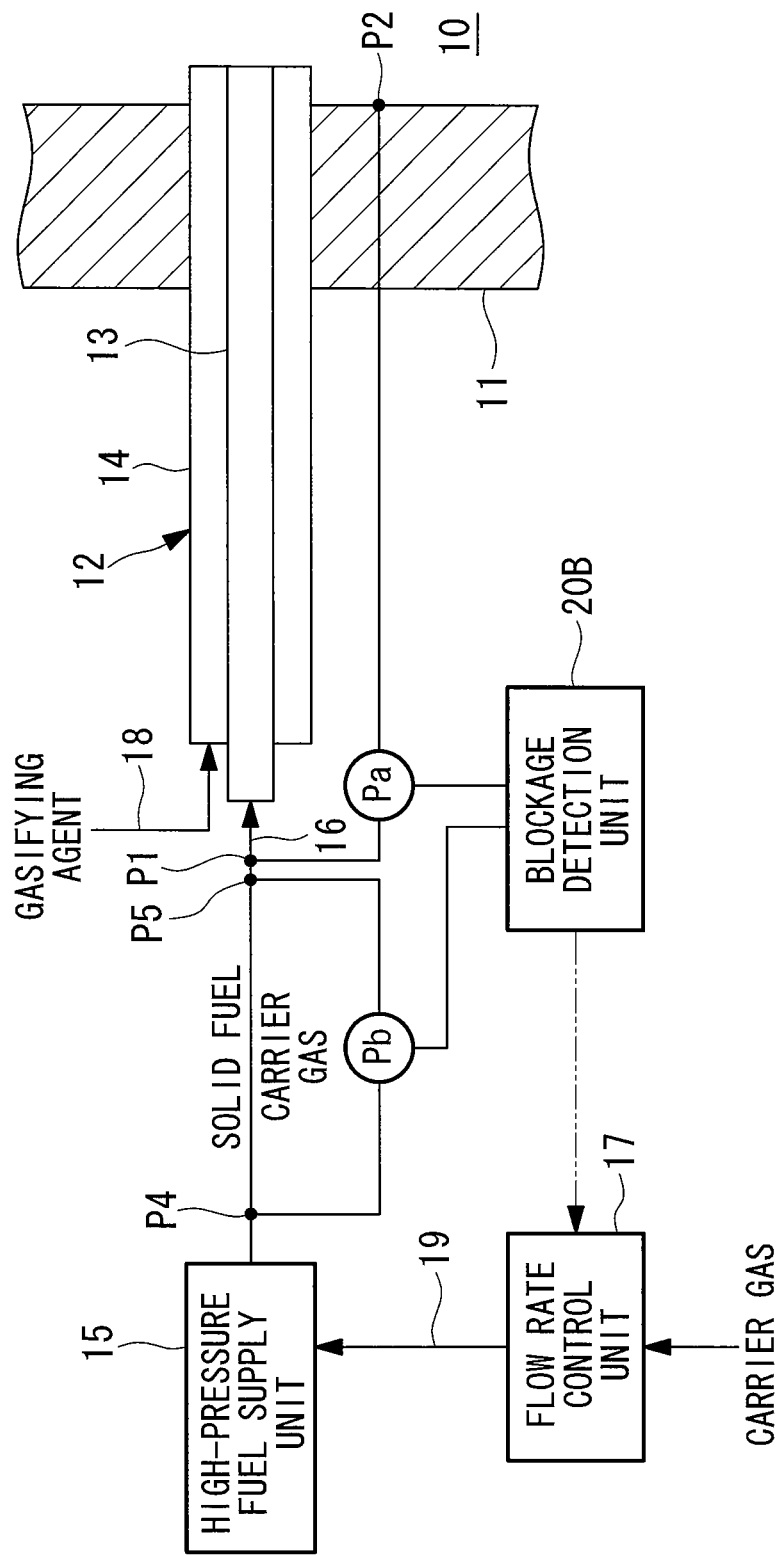
FIG. 5 is a configuration diagram of a relevant part illustrating a third embodiment of a burner for highly caking coal and a gasifier according to the present invention.
Figure 6:
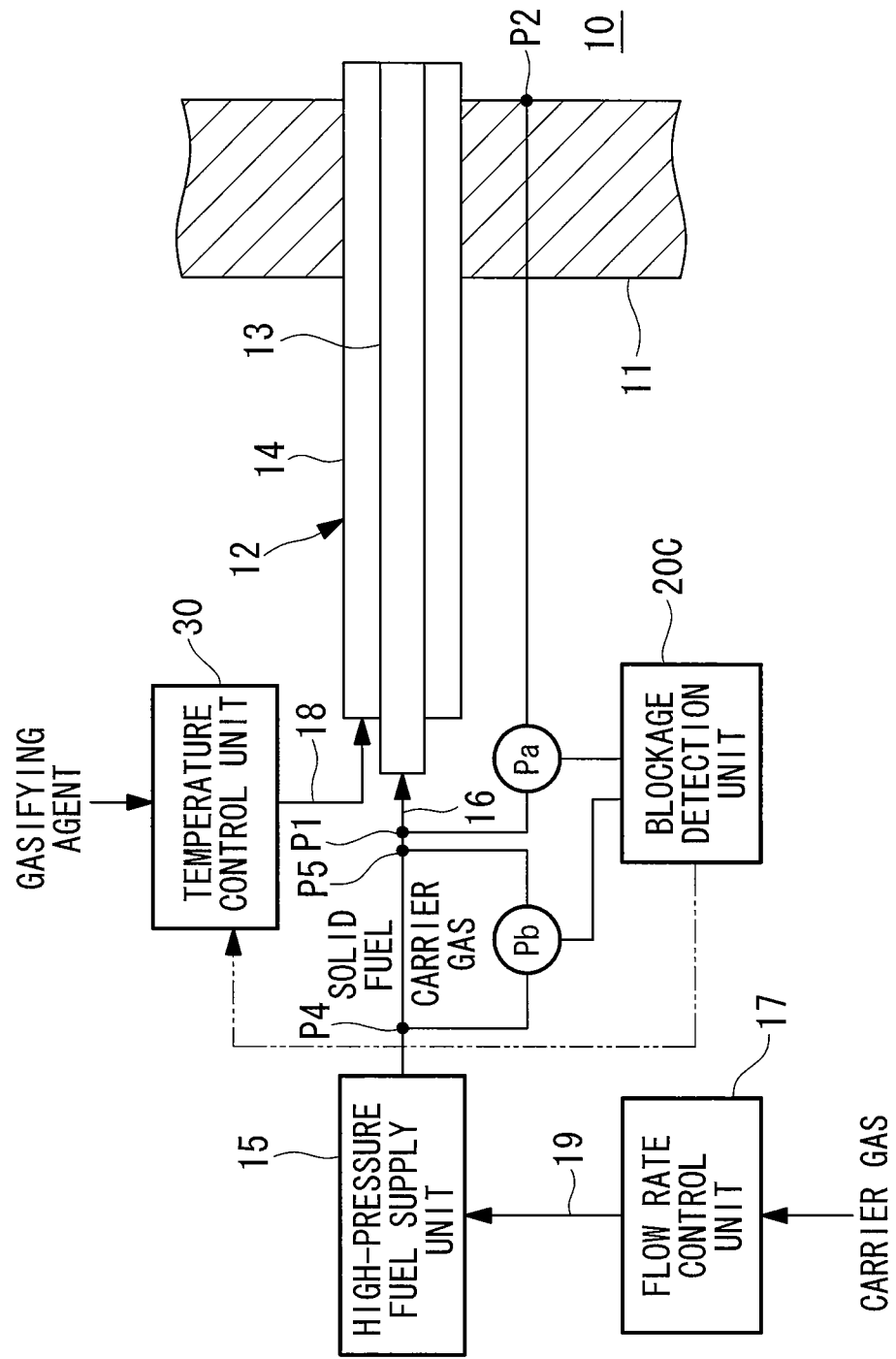
FIG. 6 is a configuration diagram of a relevant part illustrating a burner for highly caking coal and a gasifier as a modification of the third embodiment shown in FIG. 5.

A control for increasing the flow rate of the carrier gas is performed in the embodiment shown in FIG. 5 as the temperature reduction process at the time of detecting a predetermined blockage situation. However, when a predetermined blockage situation is detected, it is also possible to decrease the temperature of the gasifying agent as the temperature reduction process performed by a blockage detection unit 20C, as in a modification shown in FIG. 6.

Fourth Embodiment

Figure 7:
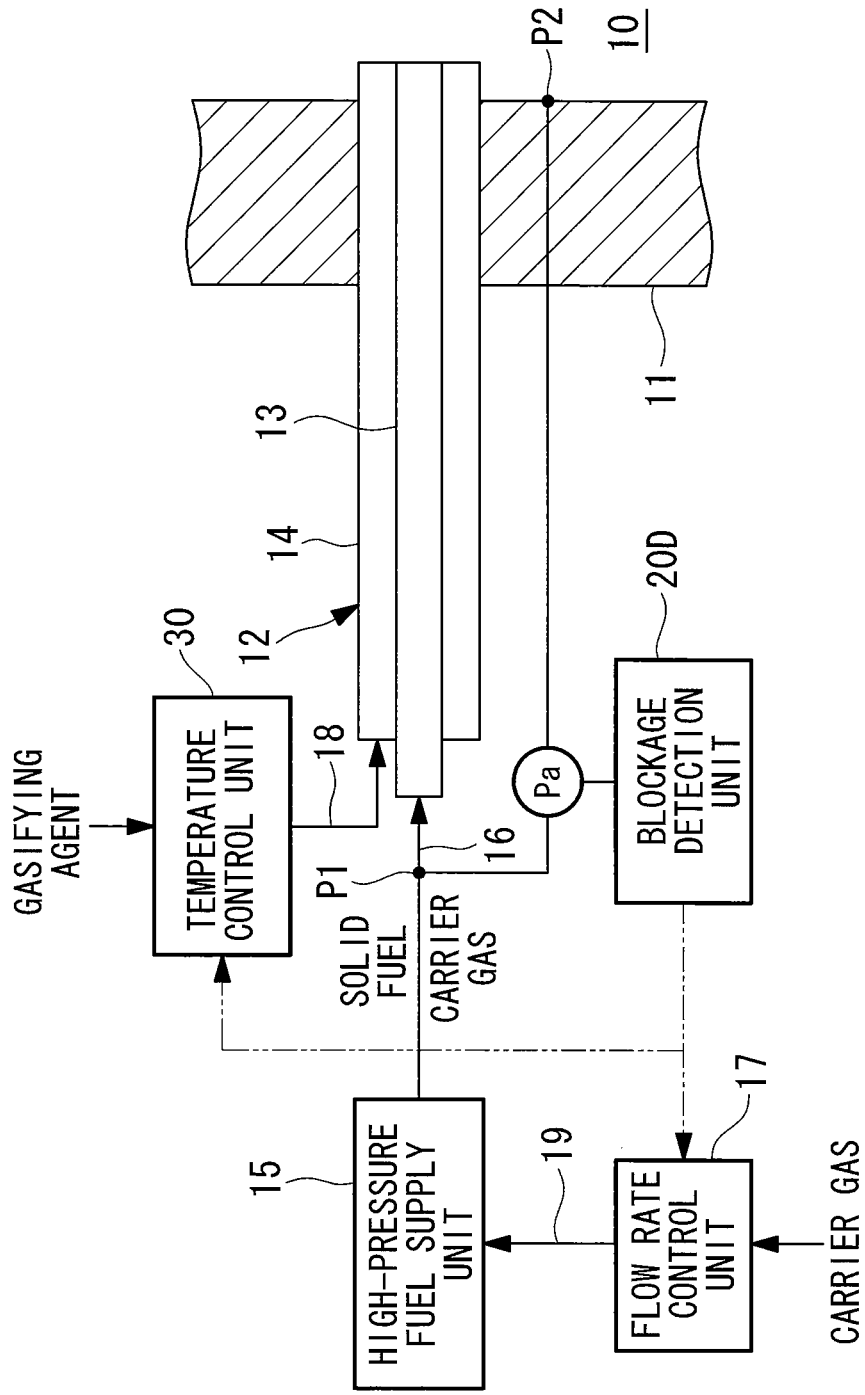
FIG. 7 is a configuration diagram of a relevant part illustrating a fourth embodiment of a burner for highly caking coal and a gasifier according to the present invention.

A fourth embodiment of the present invention will be described based on FIG. 7. It should be noted that the same portions in FIG. 7 as in the above-described embodiments are denoted by the same reference numerals, and a detailed description thereof has been omitted.

In this embodiment, when a blockage situation of the solid fuel channel 13 is detected, a temperature reduction process carried out by a blockage detection unit 20D is performed that includes, in combination, outputting a control signal for increasing the amount of the carrier gas used for gas flow transportation, and outputting a control signal for decreasing the temperature of the gasifying agent. That is, the amount of heat exchanged between the solid fuel and the high-temperature gasifying agent can be reduced even more efficiently by reducing the retention time of the solid fuel and the carrier gas in the solid fuel channel 13 by increasing the flow rate of the carrier gas, while reducing the temperature of the gasifying agent as well as the temperature difference between the solid fuel and the carrier gas that flow through the inside of the solid fuel channel 13.

Figure 8:
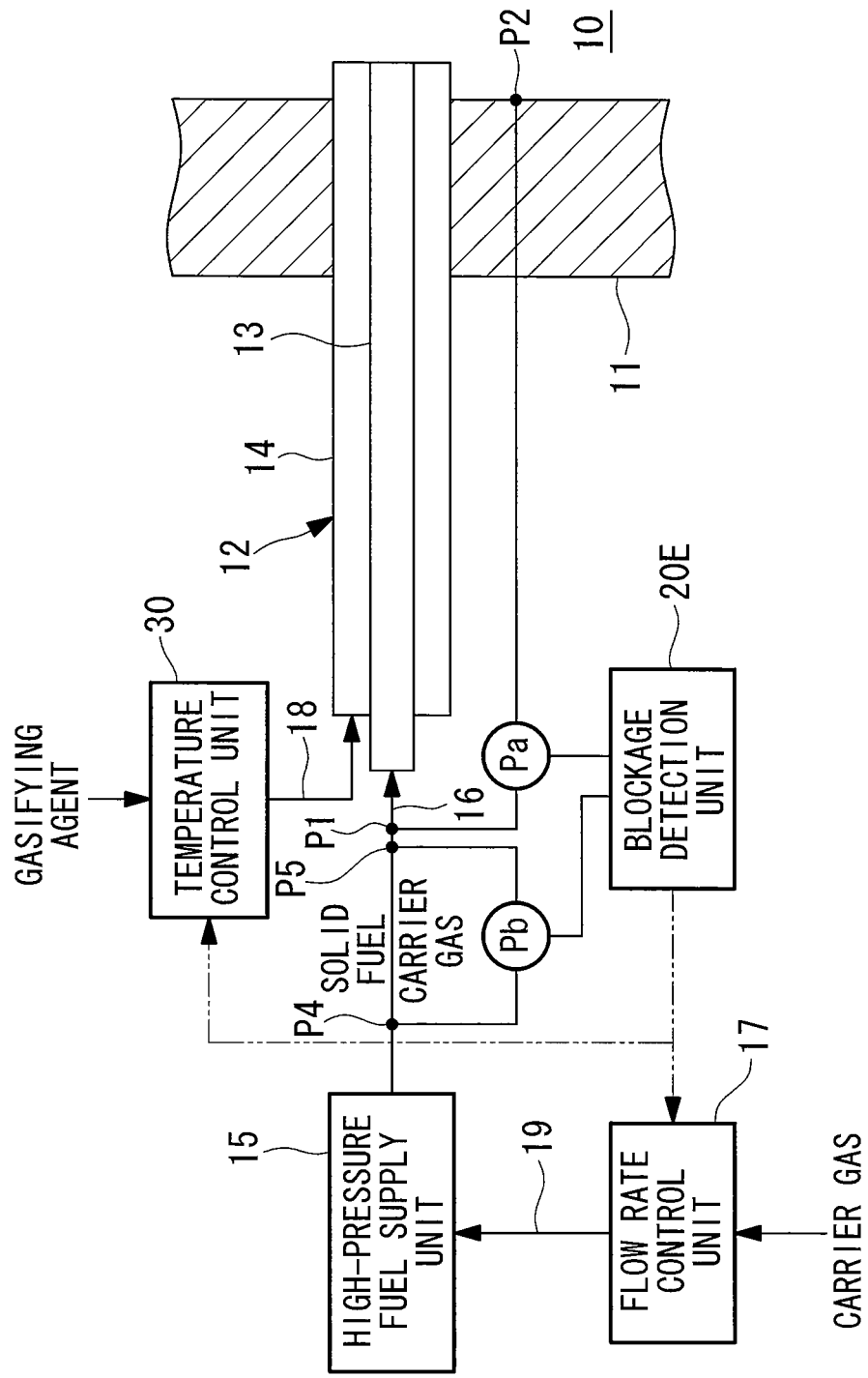
FIG. 8 is a configuration diagram of a relevant part illustrating a burner for highly caking coal and a gasifier as a modification of the fourth embodiment shown in FIG. 7.

A blockage detection unit 20E of a modification as shown in FIG. 8 uses a flow loss coefficient $\lambda'$ converted based on a differential pressure ratio as a judgment criterion for detecting a blockage situation of the solid fuel channel 13, in place of the flow loss coefficient $\lambda$ converted from a differential pressure Pa. Therefore, with the combination of a reduction in the retention time of the solid fuel and the carrier gas in the solid fuel channel 13 by increasing the flow rate of the carrier gas, and a reduction in the temperature of the gasifying agent and in the temperature difference between the solid fuel and the carrier gas that flow through the inside of the solid fuel channel 13, the amount of heat exchanged between the solid fuel and the high-temperature gasifying agent can be reduced even more efficiently. Moreover, it is possible to judge a blockage situation of the solid fuel channel 13 even more reliably, using, as a judgment criterion, whether or not the flow loss coefficient $\lambda'$ has at least a predetermined value.

Fifth Embodiment

Figure 9:
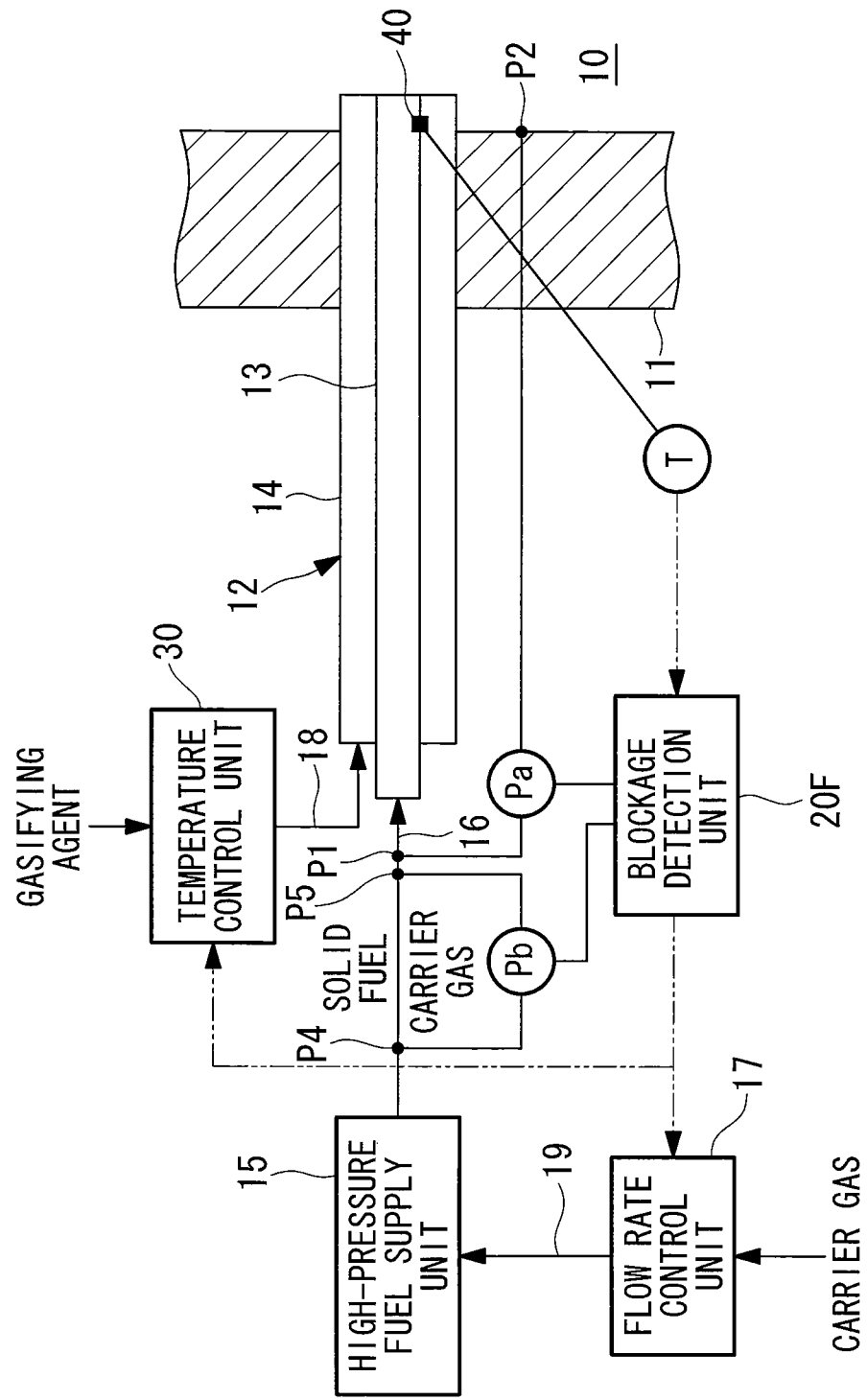
FIG. 9 is a configuration diagram of a relevant part illustrating a fifth embodiment of a burner for highly caking coal and a gasifier according to the present invention.

A fifth embodiment of the present invention will be described based on FIG. 9. It should be noted that the same portions in FIG. 9 as in the above-described embodiments are denoted by the same reference numerals, and a detailed description thereof has been omitted.

A blockage detection unit 20F of this embodiment is provided with a temperature sensor 40 that detects an internal surface temperature T of the solid fuel channel 13 and serves as an upper limit monitoring means that monitors the internal surface temperature T so that it does not become greater than a preset temperature determined according to the caking property of the solid fuel, at the time of performing a temperature reduction process. Preferably, the temperature sensor 40 detects the internal surface temperature of the solid fuel channel 13 by being installed near the exit where the temperature is highest, and the internal surface temperature T detected with the sensor 40 is input to the blockage detection unit 20F.

Meanwhile, measured values for the melting temperature, the flow temperature, the solidification temperature and the like representing the caking property of the solid fuel that is used are input in advance to the blockage detection unit 20F. In the blockage detection unit 20F, an upper limit preset temperature determined according to the caking property of the solid fuel that is actually used is decided based on these input values.

Therefore, when a temperature reduction process is performed that includes increasing the amount of the carrier gas or decreasing the temperature of the gasifying agent, or that includes, in combination, increasing the amount of the carrier gas and decreasing the temperature of the gasifying agent so that an actual internal surface temperature T does not become greater than the upper limit preset temperature, it is possible to realize an efficient operation at a maximum temperature at which the problem of channel blockage does not occur. That is, at the time of gasifying the solid fuel, by performing the operation while monitoring the internal surface temperature T so that it does not become greater than the upper limit preset temperature at the time of gasifying the solid fuel, it is possible to realize both prevention of blockage of the burner 12 due to fusion and expansion of the solid fuel, and good operation efficiency.

Furthermore, by also performing a temperature reduction process using the differential pressure ratio of the differential pressures Pa and Pb or the differential pressure Pa, it is possible to avoid, for example, the possibility that an excessively low preset temperature causes a reduction in the operation efficiency of the gasifier 10, or the possibility that an excessively high present temperature causes blockage of the burner, even if there are variations in the caking properties of solid fuels.

With the burner 12 for highly caking coal and the gasifier 10 of the present invention, the burner for highly caking coal 12 used for the gasifier 10 for gasifying a highly caking solid fuel can prevent or suppress the fusion and expansion of the solid fuel particles that could be caused by a temperature increase of the solid fuel particles, due to heat transfer in the burner, which includes the solid fuel channel 13 and the gasifying agent channel 14 in a concentric double pipe structure. Therefore, it is possible to prevent the problem that fused and expanded adjacent particles agglomerate due to the temperature increase of the highly caking solid fuel, thereby causing incomplete combustion, or the problem that those particles adhere to the internal surface of the solid fuel channel 13, thereby causing blockage of the burner. Accordingly, it is possible to operate the burner 12 for highly caking coal and the gasifier 10 in a stable manner. Furthermore, it is also possible to expand the range of applications for highly caking solid fuels that can be used for the burner 12 for highly caking coal and the gasifier 10.

The highly caking solid fuel has been described as a coal in the above-described embodiments, but the highly caking solid fuel is not limited to pulverized coal, petroleum coke and the like, and the present invention is also applicable to burners of gasifiers that use other highly caking solid fuels, including, for example, oil residue and plastics.

It should be appreciated that the present invention is not limited to the embodiments described above, and can be suitably changed without departing from the gist of the present invention.

The invention claimed is:

1. A burner for highly caking coal in which a solid fuel channel that is attached penetrating through a furnace wall of a gasifier for gasifying a highly caking solid fuel that has been pulverized into particles and that supplies the solid fuel into the gasifier by gas flow transportation, and a gasifying agent channel that supplies a gasifying agent into the gasifier are provided in a concentric double pipe structure, wherein a blockage situation detection means that detects a blockage situation of the solid fuel channel is provided, wherein a temperature of the solid fuel is reduced when the blockage situation detection means detects a predetermined blockage situation, wherein the blockage situation detection means detects a differential pressure between a burner inlet of the solid fuel channel and a suitable place located downstream from the burner inlet, and judges that a blockage situation is detected when a flow loss coefficient converted from the differential pressure increases to at least a predetermined value, and wherein the temperature of the solid fuel is reduced on the basis of, in combination, an output of a control signal for increasing an amount of a carrier gas used for the gas flow transportation, and an output of a control signal for decreasing a temperature of the gasifying agent.

2. The burner for highly caking coal according to claim 1, wherein the temperature of the solid fuel is reduced on the basis of an output of a control signal for increasing an amount of a carrier gas used for the gas flow transportation.

3. The burner for highly caking coal according to claim 1, wherein the temperature of the solid fuel is reduced on the basis of an output of a control signal for decreasing a temperature of the gasifying agent.

4. The burner for highly caking coal according to claim 1, wherein the temperature of the solid fuel is reduced on the basis of an upper limit monitoring means that detects an internal surface temperature of the solid fuel channel and that monitors the internal surface temperature so that the internal surface temperature does not become greater than a preset temperature determined according to a caking property of the solid fuel.

5. A gasifier into which a solid fuel such as particulate highly caking coal is supplied by gas flow transportation, and that subjects the solid fuel to a gasification treatment under a high-pressure environment together with a gasifying agent, wherein the gasifier comprises the burner for highly caking coal according to claim 1.

6. A burner for highly caking coal in which a solid fuel channel that is attached penetrating through a furnace wall of a gasifier for gasifying a highly caking solid fuel that has been pulverized into particles and that supplies the solid fuel into the gasifier by gas flow transportation, and a gasifying agent channel that supplies a gasifying agent into the gasifier are provided in a concentric double pipe structure, wherein a blockage situation detection means that detects a blockage situation of the solid fuel channel is provided, wherein a temperature of the solid fuel is reduced when the blockage situation detection means detects a predetermined blockage situation, wherein the blockage situation detection means judges that a blockage when a flow loss coefficient converted from a differential pressure ratio of a first differential pressure detected between a burner inlet and a suitable place located downstream from the burner inlet and a second differential pressure measured in an arbitrary section set in a fuel supply line connected to an upstream side of the solid fuel channel increases to at least a predetermined value, and wherein the temperature of the solid fuel is reduced on the basis of, in combination, an output of a control signal for increasing an amount of a carrier gas used for the gas flow transportation, and an output of a control signal for decreasing a temperature of the gasifying agent.

7. The burner for highly caking coal according to claim 6, wherein the temperature of the solid fuel is reduced on the basis of an output of a control signal for increasing an amount of a carrier gas used for the gas flow transportation.

8. The burner for highly caking coal according to claim 6, wherein the temperature of the solid fuel is reduced on the basis of an output of a control signal for decreasing a temperature of the gasifying agent.

9. The burner for highly caking coal according to claim 6, wherein the temperature of the solid fuel is reduced on the basis of an upper limit monitoring means that detects an internal surface temperature of the solid fuel channel, and monitors the internal surface temperature so that the internal surface temperature does not become greater than a preset temperature determined according to a caking property of the solid fuel.

10. A gasifier into which a solid fuel such as particulate highly caking coal is supplied by gas flow transportation, and that subjects the solid fuel to a gasification treatment under a high-pressure environment together with a gasifying agent, wherein the gasifier comprises the burner for highly caking coal according to claim 6.

* * * * *